United States Patent [19]

Shimasaki et al.

[11] Patent Number: 5,763,977
[45] Date of Patent: Jun. 9, 1998

[54] MOTOR VEHICLE ALTERNATOR AND SYSTEM FOR CONTROLLING THE SAME

[75] Inventors: Yuichi Shimasaki; Shunichi Tsuzuki; Hiroaki Kato, all of Wako, Japan

[73] Assignee: Honda Giken Kogyo Kabushiki Kaisha, Tokyo, Japan

[21] Appl. No.: 683,956

[22] Filed: Jul. 19, 1996

[30] Foreign Application Priority Data

Jul. 21, 1995 [JP] Japan .................................... 7-207524
Jul. 21, 1995 [JP] Japan .................................... 7-207525

[51] Int. Cl.⁶ .................................................... H02K 21/48
[52] U.S. Cl. ........................ 310/191; 310/209; 310/162
[58] Field of Search .................... 310/51, 156, 162, 310/181, 191, 209; 318/115

[56] References Cited

U.S. PATENT DOCUMENTS

| | | | |
|---|---|---|---|
| 4,885,489 | 12/1989 | Stuhr | 310/78 |
| 5,444,976 | 8/1995 | Gonze et al. | 60/274 |
| 5,627,419 | 5/1997 | Miller | 310/74 |

FOREIGN PATENT DOCUMENTS 52-80410  7/1977  Japan .

*Primary Examiner*—Steven L. Stephan
*Assistant Examiner*—Judson H. Jones
*Attorney, Agent, or Firm*—Nikaido, Marmelstein, Murray & Oram LLP

[57] ABSTRACT

A motor vehicle alternator connected to an output shaft of an internal combustion engine mounted on a vehicle, comprising a rotor made of a permanent magnet for producing a magnetic field, an armature (stator) having a coil placed opposite to the permanent magnet rotor and a belt drive mechanism for connecting one of the permanent magnet and the armature to the output shaft of the engine to bring them into a relative rotation such that the armature relatively moves in the magnetic field produced by the permanent magnet. In the alternator, there is provided an axial displacement mechanism for displacing at least one of the permanent magnet rotor and the armature in an axial direction of the relative rotation, whereby a magnetic flux passing through the armature is changed. The axial displacement mechanism comprises a solenoid, a plunger housed in the solenoid to be movable when the solenoid is energized and a lever connected to the plunger at one end and to a carrier that carries the armature such that it pivots about a fulcrum to displace the armature in the axial direction of the relative rotation. Other types of the mechanism using a rack and pinion, etc., are used. The operation of mechanism is controlled such that a desired electric power is generated.

12 Claims, 8 Drawing Sheets

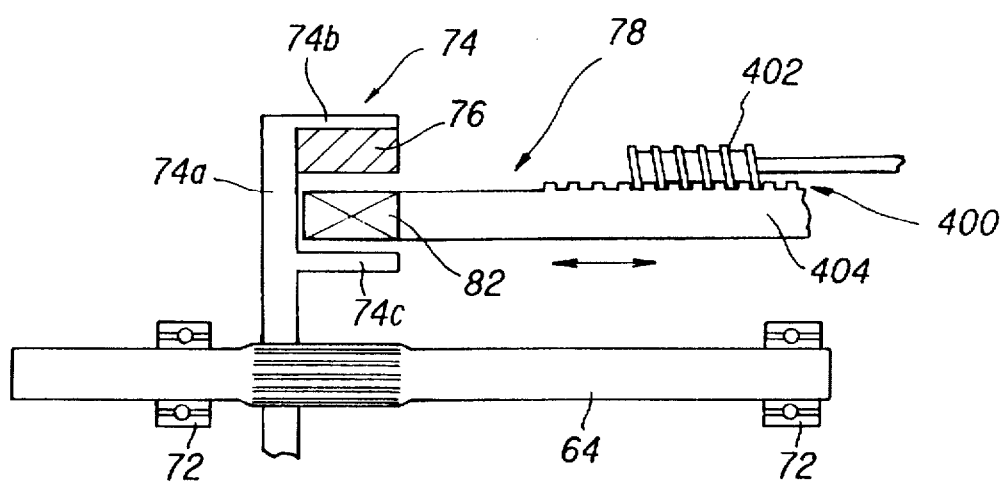

MOTOR VEHICLE ALTERNATOR AND SYSTEM FOR CONTROLLING THE SAME

BACKGROUND OF THE INVENTION

1. Field of the Invention

This invention relates to an improvement of a motor vehicle alternator and a system and a method for controlling the same.

2. Description of the Related Art

An alternator mounted on a motor vehicle generates alternating current when supplied with current in a field coil to generate a magnetic field. Since the voltage generated by the alternator varies with the speed or the field current, the voltage is regulated to a predetermined level such as 12V through closed-loop functions in a voltage regulator.

Thus, since a partial electric power generated by the alternator is used as the field current, efficiency of the alternator is not so high and further decreases by the temperature rise. In addition, the alternator requires sliprings for supplying current to the field coil, etc., it must have a cooling or ventilation. Thus, the conventional alternator is disadvantageously complicated in structure.

One way to solve the problems is to use, instead of the field coil, a permanent magnet. The use of the permanent magnet makes it unnecessary to supply the field current, enhancing efficiency. This will be most beneficial for nowaday motor vehicles mounted with various electronic devices that require more and more electric power. Since slip-rings will no longer be needed, the alternator will advantageously be small in size and light in weight.

On the other hand, the use of a permanent magnet causes the alternator to operate at all times, it becomes necessary to regulate more optimally the electric power and voltage to be generated. Moreover, the fact that the alternator is always in operation means that the alternator acts as a load to the engine and accordingly is not advantageous in fuel consumption.

As regards the electric power to be generated, since the amount of induced voltage is in proportion to $\Delta \zeta$ (change in time of the magnetic flux), it suffices to regulates the electric power if $\Delta \phi$ is changed. For that reason, Japanese Laid-Open Patent Application Sho 52(1977)-80410 proposes a motor vehicle alternator having a permanent magnet rotor, in which an annular sleeve or spacer 4 is mounted on the rotor shaft to be placed between the stator 2 and the rotor 3.

Specifically, the spacer 4 is an annular ring on which a ferromagnetic material member 11 and a nonmagnetic material member (made of plastics) 17 are placed one after the other. The number of the members 11 is the same as that of the stator cores. A motor 20 is provided for rotating the spacer 4. When the spacer 4 is rotated such that the member 11 is each placed between the stator core and the rotor magnet, the generated electric power becomes maximum, while it becomes minimum when the plastic member 11 is positioned therebetween. In the prior art alternator, the amount of electric power to be generated is controlled or regulated by changing the magnetic flux between the rotor and stator by the motor driven spacer 4.

In this type of alternator, the motor 20 must be operated continually to rotate the spacer 4 and to keep it at any position between the maximum or minimum voltage generating positions. This requires a large amount of electric power consumption, decreasing the total efficiency of the alternator.

More specifically, in order to keep the spacer 4 at a desired position, the motor must be supplied with current almost in a still condition. Since the electric power consumption of the motor usually increases in a low speed operation, the energy loss of the prior art alternator becomes great. Moreover, such a low speed motor operation causes the temperature to rise high, requiring additional structure for ventilation or cooling. Thus, the prior art alternator leaves much to be improved.

Moreover, the aforesaid prior art teaches nothing about how to regulate or control the electric power and voltage to be generated. When the permanent magnet alternator is mounted on a motor vehicle, since this type of alternator is always in operation, the electric power, if generated excessively, may damage a battery. In addition, the continuous operation of the alternator means that the alternator acts as a load for the engine as mentioned above. This may be disadvantageous depending on the operating condition of the engine.

An object of the invention is to solve the drawbacks of the prior art and to provide a small and light motor vehicle alternator having a permanent magnet to enhance efficiency, while enabling to optimally control or regulate the electric power and voltage to be generated.

Another object of the invention is to provide a method and a system for optimally controlling or regulating the electric power and voltage to be generated by a motor vehicle alternator.

SUMMARY OF THE INVENTION

In order to achieve the first object, the present invention provides a motor vehicle alternator connected to an output shaft of an internal combustion engine mounted on a vehicle, comprising a permanent magnet for producing a magnetic field, an armature placed opposite to the permanent magnet, a drive mechanism for connecting one of the permanent magnet and the armature to the output shaft of the engine to bring them into a relative rotation such that the armature relatively moves in the magnetic field produced by the permanent magnet, and an axial displacement mechanism for displacing at least one of the permanent magnet and the armature in an axial direction of the relative rotation, whereby a magnetic flux passing through the armature is changed.

In order to achieve the second object, the present invention provides a system for controlling electric power generated by a motor vehicle alternator connected to an output shaft of an internal combustion engine mounted on a vehicle, having a permanent magnet for producing a magnetic field, an armature placed opposite to the permanent magnet, a drive mechanism for connecting one of the permanent magnet and the armature to the output shaft of the engine to bring them into a relative rotation such that the armature relatively moves in the magnetic field produced by the permanent magnet, and a magnetic flux changing mechanism for a magnetic flux passing through the armature. In the system, engine operating condition detecting means is provided for detecting parameters indicative of operating conditions of the engine, desired electric power determining means is provided for determining a desired amount of electric power to be generated by the alternator in accordance with the detected parameters, and means is provided for operating the magnetic flux changing mechanism such that the desired amount of electric power is generated.

BRIEF DESCRIPTION OF THE DRAWINGS

The above and other objects and advantages of the invention will be more apparent from the following description and drawings, in which:

FIG. 10 is a view, similar to FIG. 8, but showing a motor vehicle alternator according to a fifth embodiment of the invention.

DESCRIPTION OF THE PREFERRED EMBODIMENTS

Embodiments of the invention, given by way of example only, will now be explained with reference to the drawings.

Figure 1:
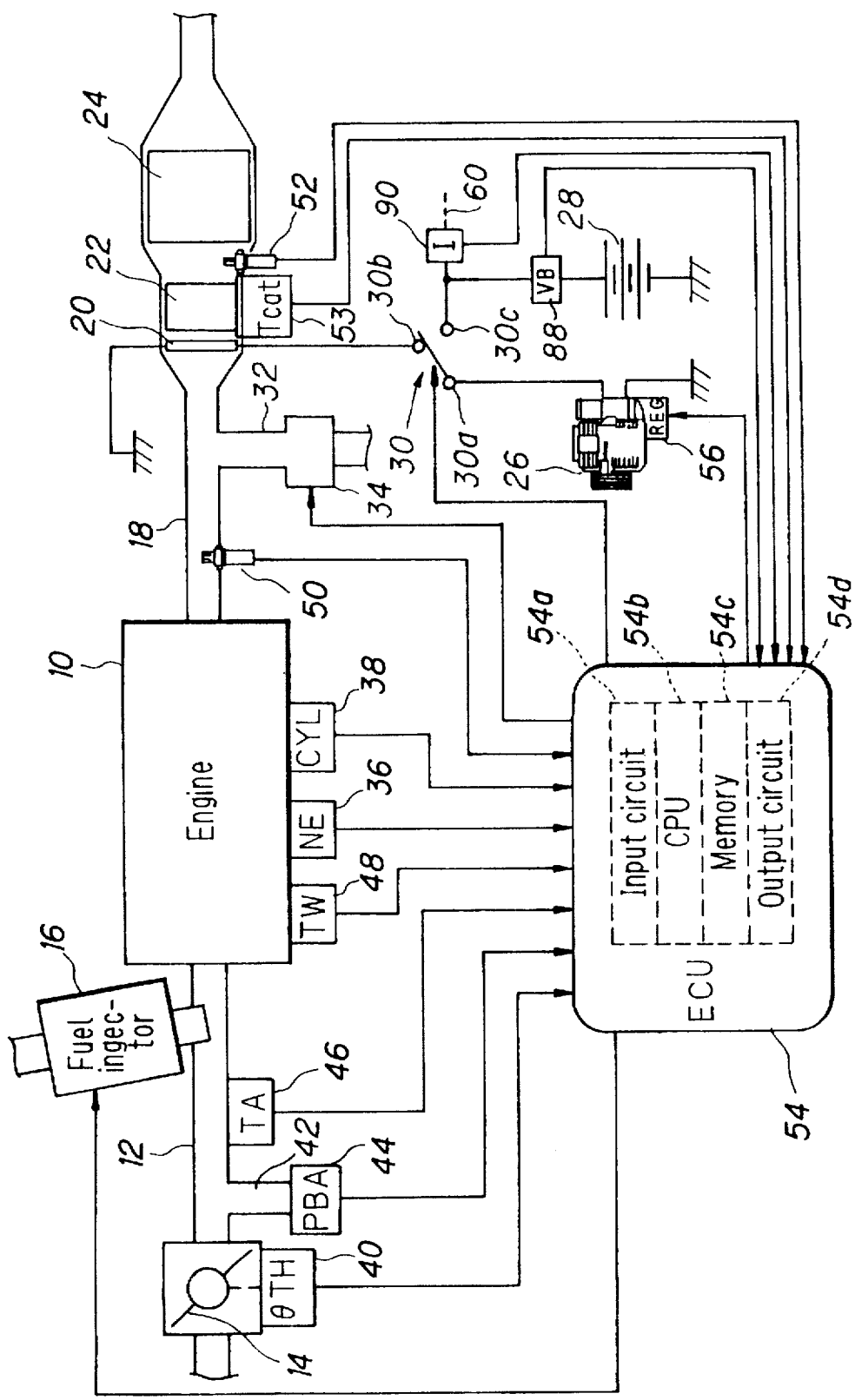
FIG. 1 is an overall schematic view showing an exhaust emission purification system of an internal combustion engine including a motor vehicle alternator according to the invention.

FIG. 1 is an overall schematic view showing an exhaust emission purification system of an internal combustion engine including the alternator according to the invention.

For ease of understanding, the exhaust emission purification system will first be explained.

Reference numeral 10 in this figure designates a multi-cylinder engine such as a four-cylinder internal combustion engine. Air drawn into an air intake pipe 12 through an air cleaner (not shown) mounted on a far end thereof is supplied to each of the first to fourth cylinders through a surge tank and an intake manifold (neither shown), while the flow thereof is adjusted by a throttle valve 14 provided in the air intake pipe 12. A fuel injector 16 for injecting fuel is installed in the vicinity of intake valves (not shown) of each cylinder of the engine. The injected fuel mixes with the intake air to form an air-fuel mixture that is ignited in the associated cylinder by a spark plug (not shown). The resulting combustion of the air-fuel mixture drives a piston (not shown) down.

The exhaust gas produced by the combustion is discharged through exhaust valves and an exhaust manifold (neither shown) to an exhaust pipe 18. The exhaust pipe 18 is installed with, in order from the upstream side (in terms of exhaust gas flow), an electrically heated catalytic converter (hereinafter referred to as "EHC") 20 having a heater (not expressly shown), a start catalytic converter 22 and a three-way catalytic converter 24, which burn off the remaining HC, CO, and NOx emissions in the exhaust gases which escape from the cylinders thus reducing pollutants in the exhaust gases from the engine exhaust system.

The body of the EHC 20, i.e., a carrier that carries the catalyst is made of a metal mesh. The metal mesh is manufactured by extruding metallic materials, then by sintering them to a ceramic bar, and then by cutting the bar into disc-shaped slices of 10 cm thickness. Thus, the metal mesh itself is configured to be an electric heater. The current path has an anode and a cathode at opposite ends thereof.

As illustrated in the figure, an alternator 26 is provided in the vicinity of the engine 10. The alternator 26 is connected to the crankshaft (not shown) of the engine 10 and is driven to produce electric power. The generated electric power is supplied to the EHC 20 or a battery 28. More specifically, a switch 30 is inserted in the current supply circuit. When terminals 30a and 30b are connected, the anode of the metal mesh (heater) of the EHC 20 is connected with the alternator 26 to be supplied with current for heating up. As a result, the heated EHC 20 burns off the remaining emissions generated immediately after the engine starting. The EHC 20 further heats up with the heat generated by the chemical reaction of the burning and promptly reaches the activation temperature, thereby promoting the start catalytic converter 22 and the three-way catalytic converter 24 installed downstream thereof to activate.

The exhaust pipe 18 is connected with a conduit 32 which has an air pump 34 at the opposite end for supplying secondary air. Since a large amount of unburned gases are produced at engine starting, the air pump 34 is installed to supply air to the exhaust pipe 18 to promote burning, thereby enhancing conversion efficiency of the catalysts.

A crankshaft position sensor 36, illustrated as "NE" in the figure, is provided on the camshaft or crankshaft (neither shown) which produces a signal once per predetermined crank angular position. A camshaft position sensor 38, illustrated as "CYL" in the figure, is similarly provided on the camshaft (not shown) which produces a signal at a prescribed crank angular position of the first cylinder. A throttle position sensor 40, illustrated as "θTH" in the figure, is connected to the throttle valve 14 to detect, and to generate a signal indicative of, the degree of opening of the throttle valve 14.

The air intake pipe 12 is branched off downstream of the position where the throttle valve 14 is placed, to have a branch 42. A manifold absolute pressure sensor 44, illustrated as "PBA" in the figure, is installed at the far end of the branch 42, to detect, and to generate a signal indicative of, the intake manifold pressure downstream of the throttle valve 14 in terms of absolute pressure.

In addition, the air intake pipe 12 is provided with an intake air temperature sensor 46, illustrated as "TA" in the figure, for detecting, and for generating a signal indicative of, the temperature of the intake air. And an engine coolant temperature sensor 48, illustrated as "TW" in the figure, for detecting, and for generating a signal indicative of, the temperature of the engine coolant is provided at a suitable location on the engine 10.

On the other hand, the exhaust pipe 18 is provided with, upstream of the intersection where the conduit 32 is connected, a first oxygen sensor 50 comprising an $O_2$ sensor for detecting, and for generating a signal indicative of, the oxygen content in the exhaust gases. The exhaust pipe 18 is further provided with a second oxygen sensor 52 similarly comprising an $O_2$ sensor, at a position between the start catalytic converter 22 and the three-way catalytic converter 24. A temperature sensor 53, illustrated as "Tcat" in the figure, is provided in the proximity of the second $O_2$ sensor 52 to detect, and for generating a signal indicative of, the exhaust system ambient temperature.

The signals output from the sensors are sent to a control unit 54 that is illustrated as "ECU" in the figure.

The ECU 54 comprises a microcomputer made up of an input circuit 54a, a CPU 54b, a memory 54c and an output circuit 54d. The input circuit 54a carries out various procedures including shaping some sensor signal waveforms, converting some sensor signals to predetermined levels in voltage, and converting some analog sensor signals into digital values. The memory 54c stores various data including calculation programs and the results of the calculations in response to the instructions made by the CPU 54b.

The CPU 54b operates, via the switch 30, to connect the alternator 26 to the EHC 20 to supply current thereto in response to the detected parameters. The alternator 26 has a regulator 56. The CPU 54b determines and outputs a pulse train indicative of a duty cycle in a pulse-width modulation (PWM) control such that the alternator 26 produces the electric power at a level determined by the duty cycle. In addition, the CPU 54b regulates or controls the electric power to be generated through an axial displacement mechanism (explained later).

In the switch 30, on the other hand, when the terminal 30a is switched to connect with the terminal 30c, the alternator 26 is connected with the battery 28 to charge it. The battery 28 is connected, through a line 60, to various electric loads including an electric motor (not shown) of the air pump 34. The CPU 54b controls the operation of the air pump 34 by controlling the operation of the motor, and controls fuel metering through the fuel injector 16. More specifically, the CPU 54b determines the quantity of fuel injection in terms of time and controls the fuel injector 16 to open for the determined time.

Figure 2:
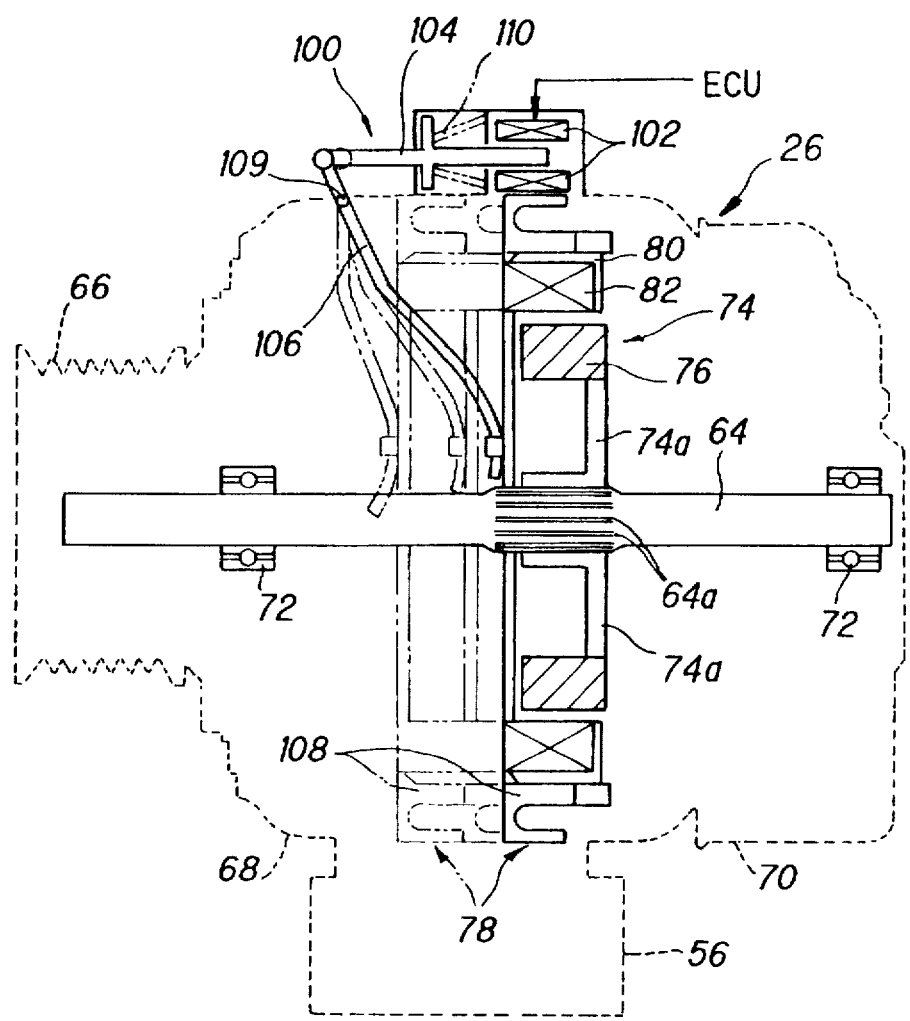
FIG. 2 is an explanatory sectional side view of the alternator including a voltage regulator and having an axial displacement mechanism illustrated in FIG. 1.

Here, the alternator according to the invention will be explained with reference to FIGS. 2 and 3. FIG. 2 is an explanatory side sectional view of the alternator 26 including the voltage regulator 56 and FIG. 3 is a circuit diagram showing their operation.

As disclosed, the alternator 26 has a rotor shaft 64 which is connected to the crankshaft of the engine 10 through a belt drive mechanism having a pulley 66 and a belt (not shown) to be driven in the speed twice the engine speed NE. The rotor shaft 64 is ratably mounted on a drive end frame 68 and a side end frame 70 via bearings 72, 72.

The rotor shaft 64 is provided with keys 64a on the outer surface thereof. A rotor 74 is carried on a rotor carrier 74a of a disc-shape which is spline-fitted on the rotor shaft 64 and is firmly secured in position on the shaft. The rotor 74 is made of a permanent magnet 76 having one pole pair for producing a magnetic field in the medium (air). Reference number 78 indicates a stator (armature) that is disposed opposite to the permanent magnet rotor 74 therearound keeping a predetermined distance (air gap) therefrom such that it moves in the magnetic field produced by the permanent magnet 76. The stator 78 is provided with three cores at every 120 degrees in the circumferential direction, respective of which has a winding to form a stator coil (armature coil) 82. Upon the rotation of the permanent magnet rotor 74, a three-phase alternating current is induced in response to the change in time of magnetic flux AO in the magnetic field, as is well known in the art.

Figure 3:
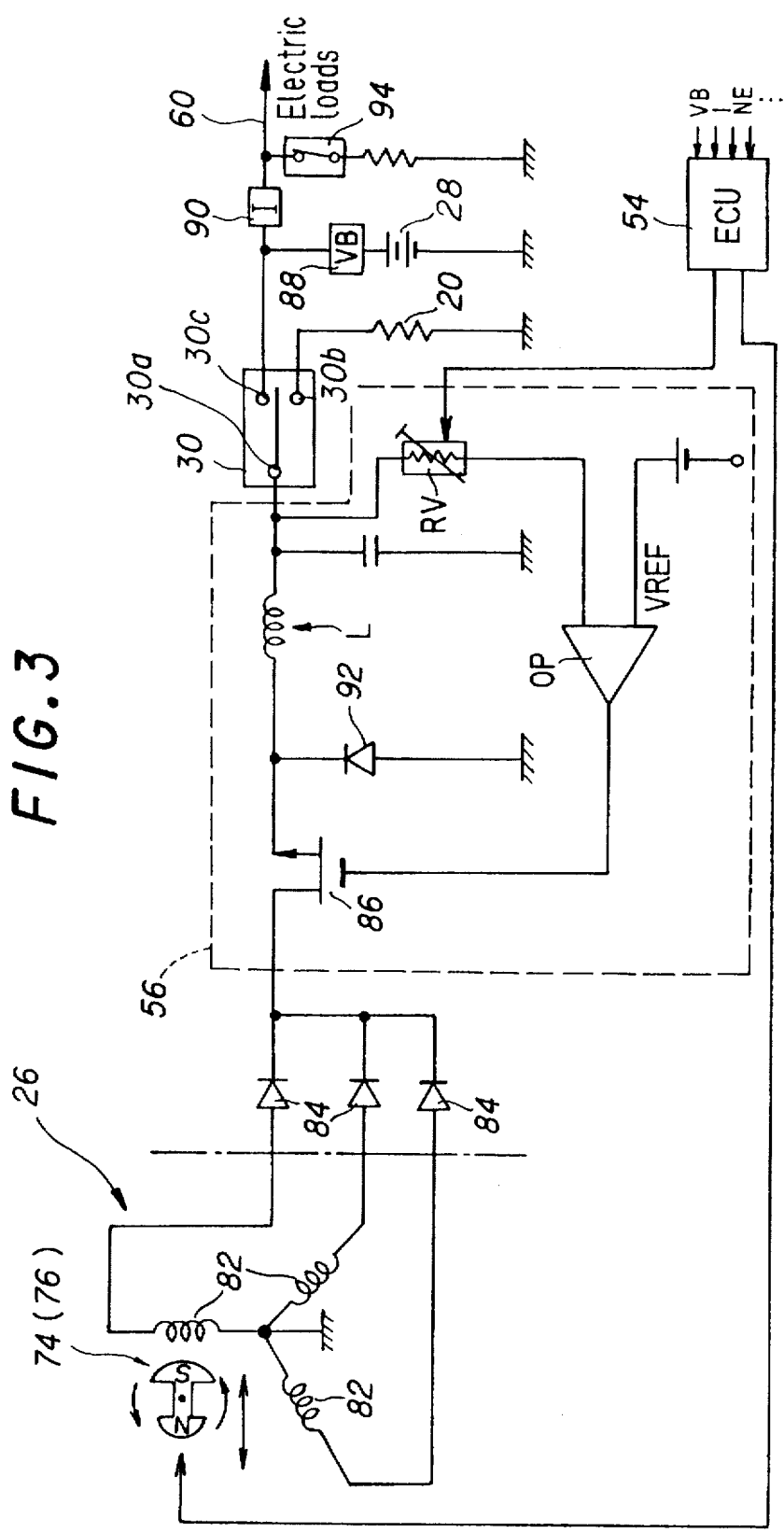
FIG. 3 is a circuit diagram showing the operation of the alternator and a voltage regulator illustrated in FIG. 2.

Specifically, the windings of the three stator coils 82 is Y-connected and as disclosed in FIG. 3, the thus-produced alternating currents are rectified by diodes 84 and are input to the voltage regulator 56. The voltage regulator 56 is constituted as a switching regulator of "voltage-drop" type and has a MOS FET 86. The voltage regulator 56 turns the FET 86 to chop the input voltage in the vicinity of a desired level by regulating the FET gate terminal voltage and outputs it through a chalk coil L. The output voltage is taken out downstream of the chalk coil L and is dropped to an appropriate level by a variable resistor RV. The voltage is input to an operational amplifier OP where a difference from a reference voltage VREF is obtained and is fed back to the gate terminal of the FET 86.

The ECU 54 has a voltmeter 88, illustrated as "VB" in the figure, that detects and generates a signal indicative of, the battery voltage VB and a current meter 90, illustrated as "I" in the figure, that detects and generates a signal indicative of, the current passing along the line 60 to the electric loads. The ECU 54 controls or regulates the alternator output voltage to a desired amount such as 30V when the current supply should be made to the EHC 20, or to 12V, etc., as will be explained just below. In the figure, reference numeral 92 indicates a flywheel diode and 94 an ignition switch.

Figure 4:
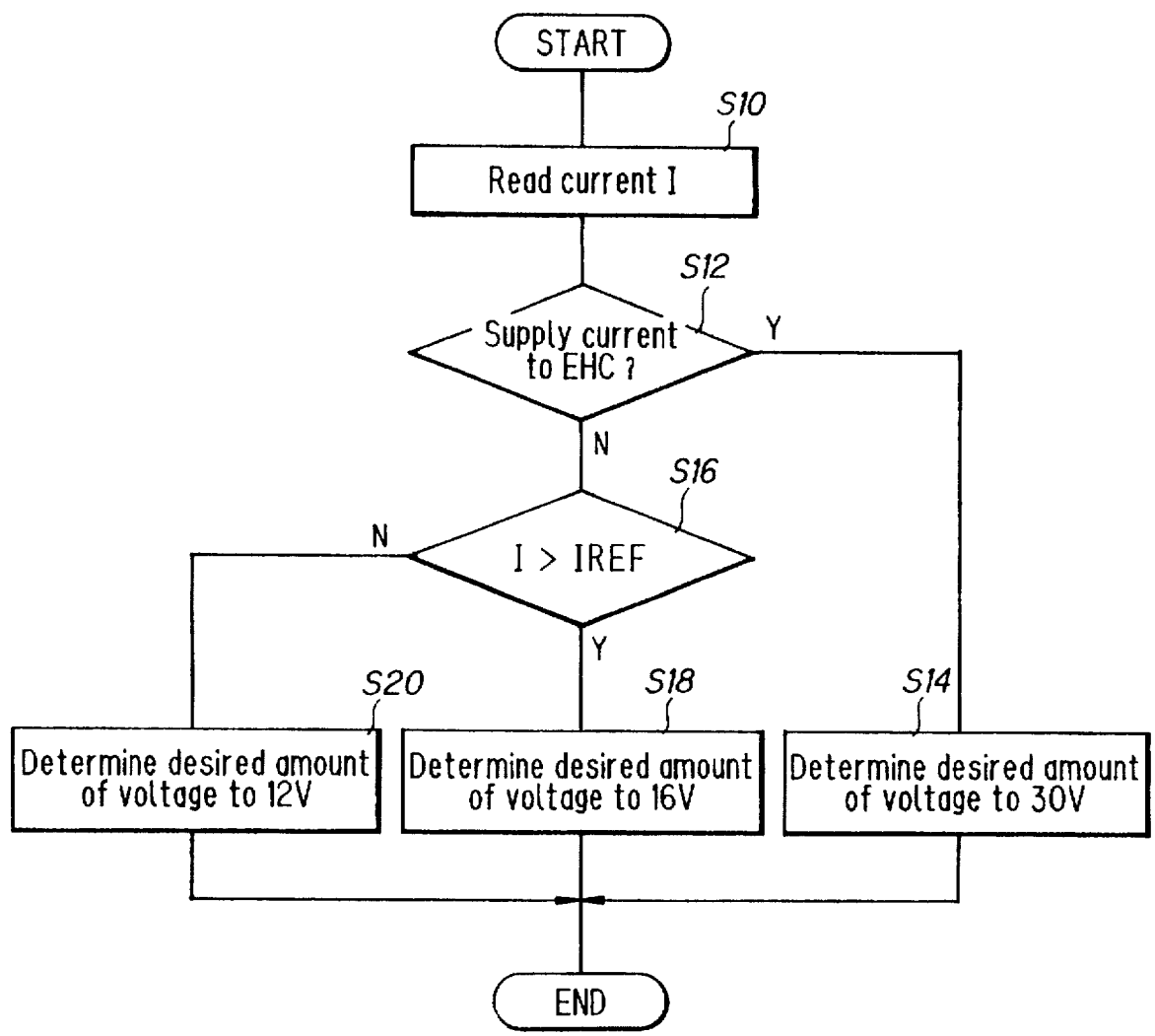
FIG. 4 is a flowchart showing the determination of a desired voltage in an electric power control according to the invention.

The determination of the desired voltage will then be explained with reference to a flowchart of FIG. 4.

The program begins at S10 in which the detected current I is read and the program proceeds to S12 in which it is checked whether the current supply to the EHC 20 should be carried out. The decision is made by referring to a flag used in the current supply control to the EHC conducted through another routine (not shown).

When the result in S12 is affirmative, the program goes to S14 in which the desired amount of voltage to be generated is determined to be 30V and controls the gate terminal voltage of the FET 86 through the variable resistance RV such that the alternator 26 generates the desired voltage. Specifically, since the voltage to be applied to the EHC 20 is determined based on the exhaust system ambient temperature Tcat and the intake air temperature TA, etc., the desired value is determined to be voltage to be applied to the EHC 20 in accordance with the parameters under the current engine operating condition.

On the other hand, when S12 finds that the current supply to the EHC 20 should not be made, the program goes to S16 in which it is checked whether the current I passing through the electric loads exceeds a predetermined current REF, and if it does, the program advances to S18 in which the desired value is determined to be 16V. If the result in S16 is negative, the program moves to S20 in which the desired value is determined to be 12V.

Next, the control of electric power to be generated by the alternator will be explained. Since the control is conducted using an axial displacement mechanism for displacing the rotor (or stator) in the axial direction, the mechanism will first be explained again referring to FIG. 2.

As illustrated, the axial displacement mechanism, generally assigned with reference numeral 100, comprises a solenoid $10_2$ mounted on the side end frame 70. A plunger 104 is movably housed in the solenoid that is pivotally connected with a lever 106 at its free end. A disc 108 is provided for carrying the stator 78. As illustrated by phantom lines in the figure, the disc 108 and the stator 78 are arranged to be displaceable in the axial (longitudinal) direction of the rotor shaft 64.

More specifically, the lever 106 is fixed to the back of the disc 108 at its free end and is connected to the solenoid plunger 104 at the opposite end. When the solenoid 102 is energized, the plunger 104 is drawn right in the figure. As a result, the lever 106 pivots about the fulcrum 109 to displace the disc 108 and stator 78 (and stator coil 82) carried thereon left in the figure. In FIG. 2, when the stator 78 (stator coil 82) is placed at the position indicated by solid lines, the density of magnetic flux produced by the permanent magnet 76 and passing through the coil 82 becomes largest such that the maximum electric power is generated. On the other hand, when the stator 78 is displaced to the leftist position shown by phantom lines, the magnetic flux intensity decreases to the least such that the minimum electric power is generated. The plunger 104 is urged right by a spring 110, i.e., is urged in the direction in which the generated electric power becomes maximum.

The ECU 54 controls the amount of stroke of the plunger 104 in any value between 0 (when the solenoid is deenergized) and the maximum to regulate the axial displacement of the stator by pulse-width modulation controlling the solenoid 102 such that a desired amount of electric power is generated by the alternator 26.

The control will then be explained with reference to the flowchart illustrated in FIG. 5.

The program starts at S100 in which the desired amount of voltage (determined in the procedures shown in FIG. 4) and detected parameters indicating operating conditions of the vehicle including the engine speed NE, the manifold pressure PBA and the throttle opening degree θTH are read. The program then goes to S102 in which a desired amount of electric power W is determined. The desired amount of electric power W is determined such that the aforesaid desired voltage is obtained, while taking into account the engine operating condition detected by the parameters.

For example, when the engine is being accelerated, the stator 78 is displaced left so as to decrease magnetic flux density between the magnet rotor 76 and the stator 78, since to place the stator 78 closest to the permanent magnet rotor 74 increases the magnetic attraction therebetween and accordingly increases the load to the engine. At the time of engine deceleration, on the other hand, the stator 78 should preferably be displaced right to increase the magnetic flux density, resulting a kind of engine braking effect. This will similarly be applied to engine idling, since the engine speed becomes stable rather than when the engine has no load.

Figure 6:
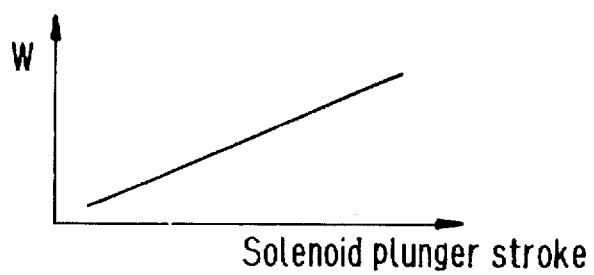
FIG. 6 is a graph showing the characteristics of plunger stroke of a solenoid in the axial displacement mechanism with respect to the amount of generated electric power referred to in the flowchart of FIG. 5.

The program then proceeds to S104 in which the amount of plunger stroke is determined based on the determined desired electric power by looking up a table whose characteristics are shown in FIG. 6. The program then goes to S106 in which a pulse train indicative of a duty cycle in the PWM is determined and is output to a driver circuit (not shown) of the solenoid 102 to achieve the determined amount of plunger stroke.

Having been configured in the foregoing, the alternator can thus enhance the current generating efficiency with the use of the permanent magnet rotor. In addition, since components including slip-rings are no longer needed, the alternator becomes small in size and light in weight. Moreover, since the voltage can be controlled or regulated to a desired value through the voltage regulator, the generated voltage can be regulated properly, ensuring no trouble such as excessive voltage rise which would damage the battery, to happen.

Furthermore, the alternator is configured to have the axial displacement mechanism for axially displacing the stator on the rotor shaft to regulate the amount of electric power to be generated, it becomes possible to control the amount of electric power optimally. When compared with the prior art alternator disclosed in the reference (Japanese Laid-Open Patent Application 52-80410), the solenoid consumes relatively less amount of electric power than the motor, enhancing the total alternator efficiency. And the temperature rise will be less, it would suffice if a small cooling fin or ventilator is provided on the axial displacement mechanism. In addition, since the alternator in the embodiment is configured to displace the stator through a solenoid, it is small in size and light in weight.

It should be noted in the above that, although the rotor made of a permanent magnet has only two poles, it may be possible to increase the number of pole pairs.

Figure 5:
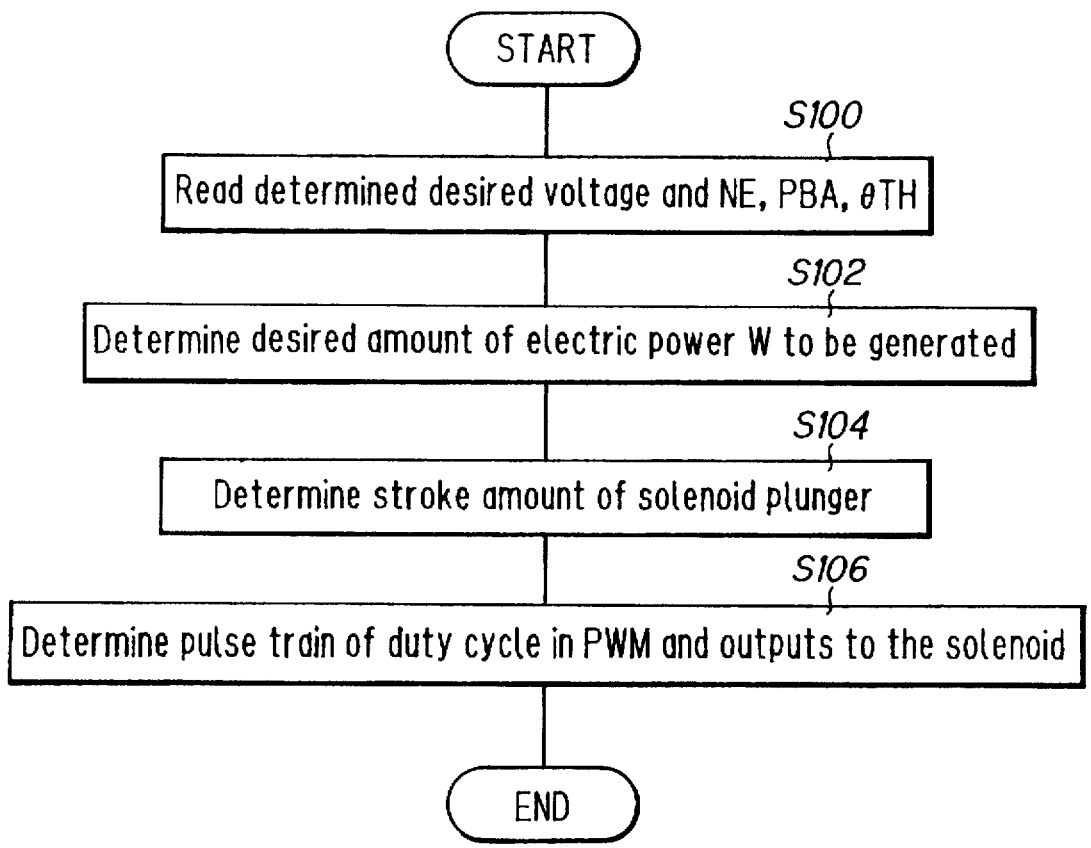
FIG. 5 is a flowchart showing the operation of the voltage regulation or control carried out by using the axial displacement mechanism.

Moreover, it should be noted in the above that, insofar as the control of the generated electric power explained with reference to FIG. 5 is concerned, the mechanism for changing magnetic flux density between the rotor and stator is not limited to the axial displacement mechanism illustrated, but the spacer mechanism shown in the prior art reference (52-80410) can instead be utilized.

Figure 7:
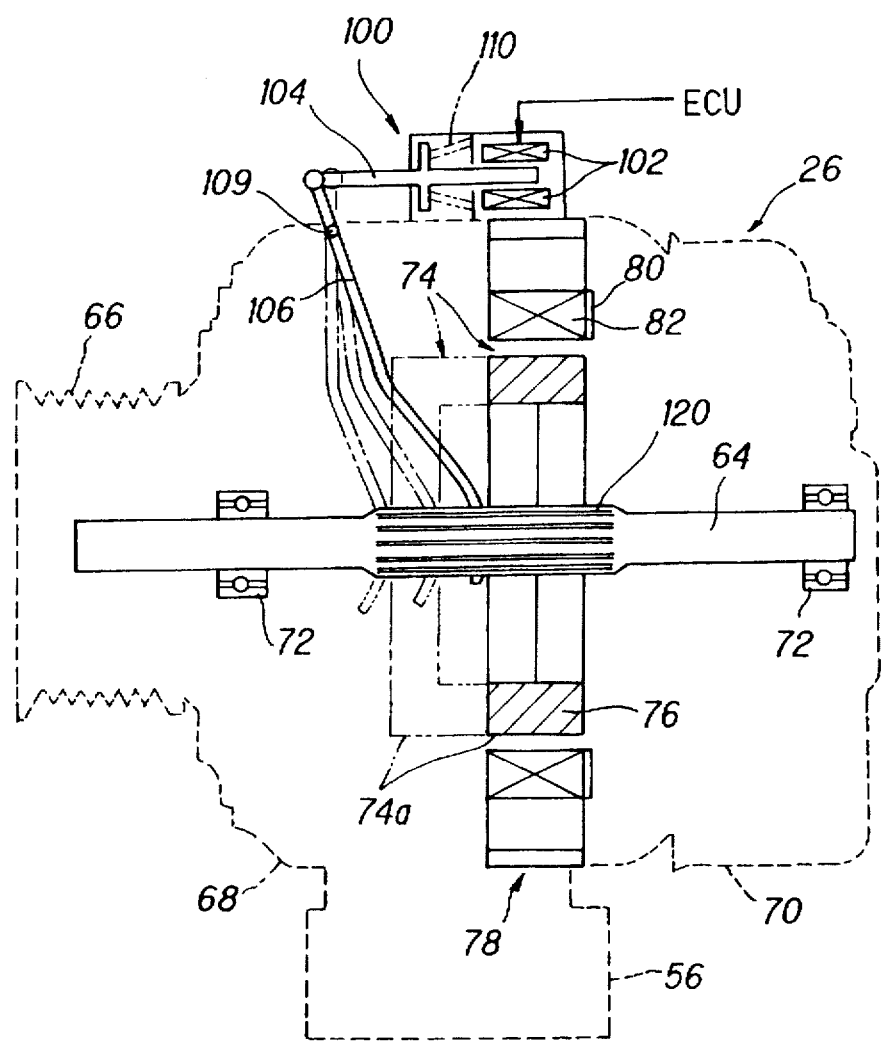
FIG. 7 is a view, similar to FIG. 2, but showing a motor vehicle alternator according to a second embodiment of the invention.

FIG. 7 is a view, similar to FIG. 2, but showing a motor vehicle alternator according to a second embodiment of the invention. Members of the second and later embodiments which are the same as those of the first embodiment will be assigned the same reference symbols as those in the first embodiment.

The alternator according to the second embodiment is configured to displace, not the stator 78, but the rotor carrier 74a. Specifically, the rotor shaft 64 has elongated keys 120 thereon and the rotor carrier 74a carrying the rotor 74 is loosely spline-fit on the shaft to be movable in the longitudinal axis of the shaft. The lever 106 is fastened to the rotor carrier 74a at its free end such that the rotor carrier 74a and the rotor 74 are displaced on the rotor shaft 64 in response to the amount of stroke of the plunger 104 of the solenoid 102. With the arrangement, the magnetic flux density between the rotor 74 and the stator 78 can similarly be changed to control or regulate the amount of electric power to be generated.

The configuration of the alternator shown in the second embodiment is more complicated than that in the first embodiment, since the members in the rotating side are to be displaced. Except for the above, however, the advantages and effects of the alternator in the second embodiment are the same as those in the first embodiment.

Figure 8:
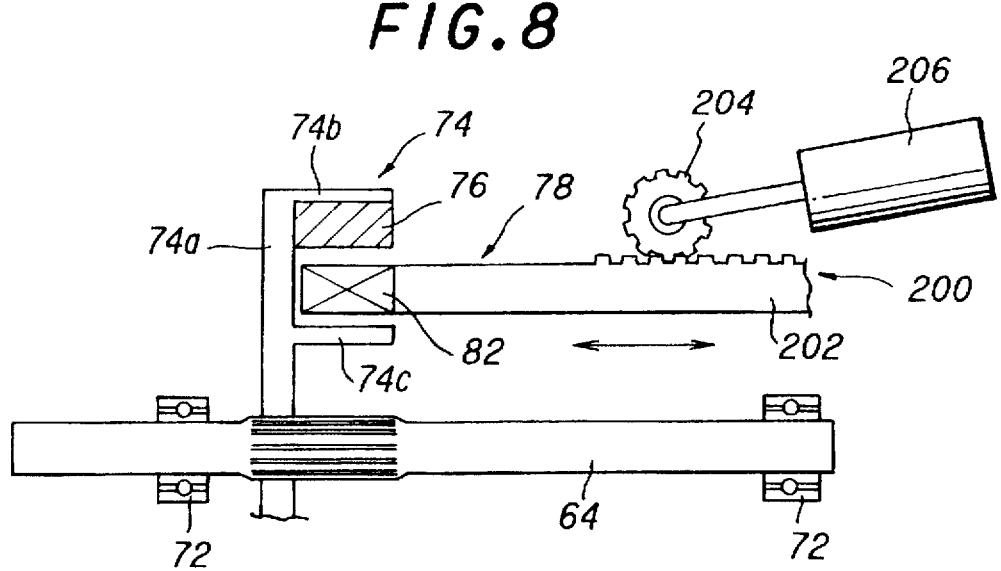
FIG. 8 is an explanatory partial sectional side view of a motor vehicle alternator according to a third embodiment of the invention.

FIG. 8 is an explanatory partial and sectional side view of the alternator according to a third embodiment of the invention.

The characteristic feature of the alternator in the third embodiment resides in the configuration of the axial displacement mechanism. Instead of the solenoid, the mechanism (assigned with numeral 200 in the third embodiment) uses a toothed rack 202 and a pinion gear 204 meshed thereon. The stator 78 (the stator coil 82) is retained at the end of the rack 202. The pinion gear 206 is connected to the output shaft (not shown) of a motor 206 in such a manner that the motor 206 drives the pinion gear 204 to displace the rack 202 and the stator 78 in the direction along the longitudinal axis of the rotor shaft 64 along a guide (not shown). The displacement of the stator 78 is detected by a detector (not shown) and the ECU 54 feedback-controls the motor 206 in accordance with appropriate characteristics such that the desired electric power is generated.

Moreover, other characteristic features of the alternator according to the third embodiment are that, the stator coil 82 is configured to be core-less type, and the rotor carrier 74a that carries the permanent magnet 76 is made of magnetic substance such as iron and is shaped to be F in cross-section such that the core-less stator coil 82 is placed between the permanent magnet 76 (resting on an upper rim 74b projecting in the direction parallel with the axis of the rotor shaft 64) and a lower rim 74c.

With the arrangement, since the stator coil 82 has no core (which would otherwise produces magnetic attraction between the permanent magnet 76), it becomes possible to decrease the force necessary for displacing the stator 78(stator coil 82) in the axial direction of the rotor shaft 64. In addition, since the stator coil is placed between the permanent magnet 76 and the lower rim 74c made of magnetic substance, it becomes possible to generate magnetic flux passing between the stator coil 82 and the lower rim 74c to increase the magnetic flux density in the magnetic field produced by the permanent magnet 76, resulting the amount of electromotive force to be generated which would almost be equal to the amount generated when the stator coil 78 would have a core. Furthermore, since the permanent magnet 76 is carried by the upper rim 74b, the magnet 76 can be firmly kept in position against the centrifugal force acted thereon.

The alternator in the third embodiment can have the same advantages and effect as those in the foregoing embodiments. Moreover, since the rack-and-pinion mechanism is used, the positioning of the stator 78 can be carried out more accurately than the configuration in the first embodiment.

Figure 9:
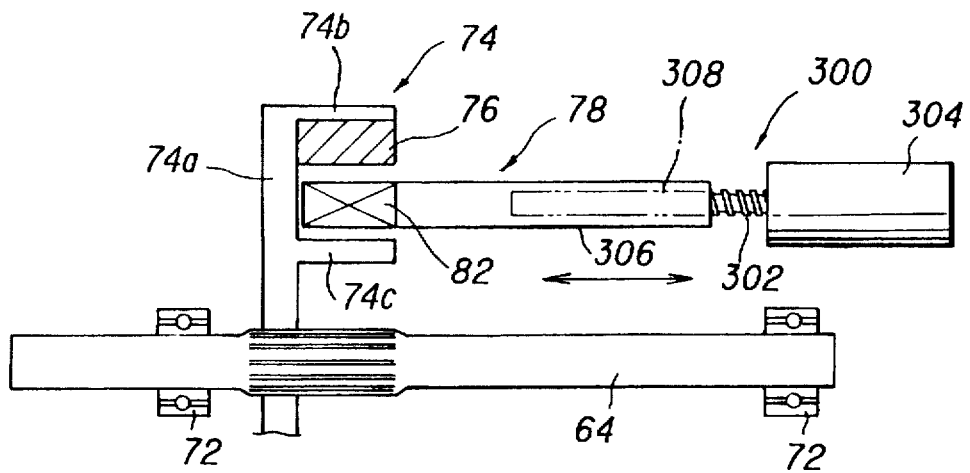
FIG. 9 is a view, similar to FIG. 8, but showing a motor vehicle alternator according to a fourth embodiment of the invention.

FIG. 9 is a view, similar to FIG. 8, but showing the motor vehicle alternator according to a fourth embodiment of the invention.

The axial displacement mechanism, generally assigned with numeral 300, has a screw 302. Specifically, the screw 30$_2$ is connected to an output shaft (not shown) of a motor 304. The stator 78 (core-less stator coil 82) is fixed to a free end of a retainer 306. The retainer 306 is provided with at the opposite end a threaded hole to be mated with the screw 302. As a result, when the screw 30$_2$ is rotated by the motor 304, the retainer 306 retaining the stator 78 can be displaced in the longitudinal direction of the rotor shaft 64 as indicated by the arrow in the figure, along a guide (not shown).

Similarly to the third embodiment, the amount of displacement is detected by a detector (not shown) and based on the detected value, the ECU 54 controls the motor 304 such that the desired electric power is generated.

Thus, the alternator in the fourth embodiment can have the same advantages and effect as those in the foregoing embodiments. Moreover, since a screw is used, the stator can similarly be positioned more accurately than the configuration in the first embodiment.

FIG. 10 is a view, similar to FIG. 8, but showing the motor vehicle alternator according to a fifth embodiment of the invention.

The axial displacement mechanism, generally assigned with numeral 400, has a worm gear 40$_2$ which is meshed with a rack 404 retaining the stator 78 (core-less stator coil 82) so as to displace the stator 78 in the longitudinal direction of the rotor shaft 64 as indicated by the arrow in the figure, along a guide (not shown), when the worm gear 402 is driven by an appropriate means such as a motor (not shown).

The rest of the fifth embodiment as well as the advantages and effects is the same as those in the foregoing embodiments.

It should be noted in the above that, although the stator is displaced in the third to fifth embodiments, it is alternatively possible to displace the rotor.

It should also be noted in the above that, although either of the stator and the rotor is displaced in the first to fifth embodiments, it is alternatively possible to displace both of them, since the magnetic flux density in the magnetic field can similarly be changed.

It should further be noted in the above that, although the invention is described with reference to first to fifth embodiments, it is alternatively possible to alter the configuration in the embodiments. For example, the alternator of the first and second embodiments may have the axial displacement mechanism of the third to fifth embodiments.

It should further be noted in the above that although a desired value is determined in terms of electric power, it is alternatively possible to determine it in terms of voltage or current.

It should further be noted in the above that the current is used for determining the desired voltage, it is alternatively possible to determine it by ON/OFF condition of switches of the electric loads. It is further possible to determine it from the detected voltage of the battery.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A motor vehicle alternator connected to an output shaft of an internal combustion engine mounted on a vehicle, comprising:

a permanent magnet for producing a magnetic field;

an armature placed opposite to the permanent magnet;

a drive mechanism for connecting one of the permanent magnet and the armature to the output shaft of the engine to bring them into a relative rotation such that the armature relatively moves in the magnetic field produced by the permanent magnet; and an axial displacement mechanism for displacing at least one of the permanent magnet and the armature in an axial direction of the relative rotation, whereby a magnetic flux passing through the armature is changed, said axial displacement mechanism comprising:

a pinion gear:

a motor connected to the pinion gear to rotate it; and a toothed rack which meshes with the pinion gear and retaining the armature such that, when the pinion gear is rotated by the motor, it moves to displace the armature in the axial direction of the relative rotation, whereby the magnetic flux passing through the armature is changed, wherein the armature has a core-less coil, and the permanent magnet is carried on a carrier made of magnetic substance and having a rim such that the core-less coil of the armature is placed between the rim and the permanent magnet.

2. An alternator according to claim 1, wherein the carrier has a second rim projecting in a direction parallel with the axial direction of the relative rotation and the permanent magnet rests on the second rim.

3. A motor vehicle alternator connected to an output shaft of an internal combustion engine mounted on a vehicle, comprising:

a permanent magnet for producing a magnetic field;

an armature placed opposite to the permanent magnet;

a drive mechanism for connecting one of the permanent magnet and the armature to the output shaft of the engine to bring them into a relative rotation such that the armature relatively moves in the magnetic field produced by the permanent magnet; and an axial displacement mechanism for displacing at least one of the permanent magnet and the armature in an axial direction of the relative rotation, whereby a magnetic flux passing through the armature is changed, said axial displacement mechanism comprising;

a screw;

a motor connected to the screw to rotate it; and a retainer having a threaded hole to be meshed with the screw and retaining the armature such that, when the screw is rotated by the motor, it moves to displace the armature in the axial direction of the relative rotation, whereby the magnetic flux passing through the armature is changed, wherein the armature has a core-less coil, and the permanent magnet is carried on a carrier made of magnetic substance and having a rim such that the core-less coil of the armature is placed between the rim and the permanent magnet.

4. An alternator according to claim 3, wherein the carrier has a second rim projecting in a direction parallel with the axial direction of the relative rotation, and the permanent magnet rests on the second rim.

5. A motor vehicle alternator connected to an output shaft of an internal combustion engine mounted on a vehicle, comprising:

a permanent magnet for producing a magnetic field;

an armature placed opposite to the permanent magnet;

a drive mechanism for connecting one of the permanent magnet and the armature to the output shaft of the engine to bring them into a relative rotation such that the armature relatively moves in the magnetic field produced by the permanent magnet; and an axial displacement mechanism for displacing at least one of the permanent magnet and the armature in an axial direction of the relative rotation, whereby a magnetic flux passing through the armature is changed, said axial displacement mechanism comprising;

a worm gear; and a rack meshed with the worm gear and retaining the armature such that, when the worm gear is rotated, it moves to displace the armature in the axial direction of the relative rotation, whereby the magnetic flux passing through the armature is changed, wherein the armature has a core-less coil, and the permanent magnet is carried on a carrier made of magnetic substance and having a rim such that the core-less coil of the armature is placed between the rim and the permanent magnet.

6. An alternator according to claim 5, wherein the carrier has a second rim projecting in a direction parallel with the axial direction of the relative rotation, and the permanent magnet rests on the second rim.

7. A system for controlling electric power generated by an alternator connected to an output shaft of an internal combustion engine mounted on a vehicle, the engine including an exhaust system with a catalytic convertor therein, with the catalytic convertor having a heater connected to the alternator, and being supplied with current from the alternator, said system comprising:

a permanent magnet for producing a magnetic field;

an armature placed opposite to the permanent magnet;

a drive mechanism for connecting one of the permanent magnet and the armature to the output shaft of the engine to bring them into a relative rotation such that the armature relatively moves in the magnetic field produced by the permanent magnet; and a magnetic flux changing mechanism for changing a magnetic flux through the armature;

heater current supply determining means for determining whether the current should be provided from the alternator to the heater;

desired electric power determining means for determining a desired amount of electric power to be generated by the alternator in response to the determination of the heater current supply determining means; and means for controlling the magnetic flux changing mechanism such that the desired amount of electric power is generated.

8. A system according to claim 7, further including:

engine operating condition detecting means for detecting parameters indicative of operating conditions of the engine;

wherein said desired electric power determining means determines the desired amount of electric power in response to the determination of the heater current supply determining means and the detected parameters.

9. A system according to claim 7, wherein the magnetic flux changing mechanism co rises an axial displacement mechanism for displacing at least one of the permanent magnet and the armature in an axial direction of the relative rotation, whereby a magnetic flux passing through the armature is changed.

10. A method for controlling electric power generated by an alternator connected to an output shaft of an internal combustion engine mounted on a vehicle, the engine including an exhaust system with a catalytic convertor therein, with the catalytic convertor having a heater connected to the alternator, and being supplied with current from the alternator, said method comprising the steps of:

a permanent magnet for producing a magnetic field;

an armature placed opposite to the permanent magnet;

a drive mechanism for connecting one of the permanent magnet and the armature to the output shaft of the engine to bring them into a relative rotation such that the armature relatively moves in the magnetic field produced by the permanent magnet; and a magnetic flux changing mechanism for a changing magnetic flux passing through the armature;

determining whether the current should be supplied from the alternator to the heater;

determining a desired amount of electric power to be generated by the alternator in response to the determination of whether the current should be supplied to the heater; and controlling the magnetic flux changing mechanism such that the desired amount of electric power is generated.

11. A method according to claim 19, further including:

detecting parameters indicative of operating conditions of the engine; and determining the desired amount of electric power in response to the determination of the heater current supply determining means and the detected parameters.

12. A method according to claim 10, wherein the magnetic flux changing mechanism comprises an axial displacement mechanism for displacing at least one of the permanent magnet and the armature in an axial direction of the relative rotation, whereby a magnetic flux passing through the armature is changed.

* * * * *